United States Patent [19]

Low

[11] Patent Number: 4,469,346

[45] Date of Patent: Sep. 4, 1984

[54] DUAL LOAD TRAILER

[76] Inventor: Virgil T. Low, Rte. 2, Box 128, Piggott, Ark. 72454

[21] Appl. No.: 469,963

[22] Filed: Feb. 25, 1983

[51] Int. Cl.³ .............................................. B60P 3/08
[52] U.S. Cl. ................................... 280/414.1; 410/26; 414/495
[58] Field of Search ......................... 280/414.1, 414.3; 414/471, 495; 296/157, 158, 3, 27; 410/13, 24, 26, 27

[56] References Cited

U.S. PATENT DOCUMENTS 3,970,203 7/1976 Watson .............................. 280/414.1
4,068,772 1/1978 Prudhomme ......................... 410/26
4,221,420 9/1980 Vencill et al. ...................... 280/414.1

FOREIGN PATENT DOCUMENTS

1188175 9/1959 France .................................. 410/26

Primary Examiner—Joseph F. Peters, Jr.
Assistant Examiner—D. Lynn Fugate
Attorney, Agent, or Firm—Walker & McKenzie

[57] ABSTRACT

Brackets are used to couple a first trailer to a second trailer in such a manner that the second trailer can be loaded with a load such as a boat and be raised to a position above the first trailer to allow the first trailer to then be loaded with a load such as an automobile. Both trailers can then be towed behind a tow vehicle such as a motor home or the like.

8 Claims, 13 Drawing Figures

DUAL LOAD TRAILER

BACKGROUND OF THE INVENTION

1. Field of the Invention

The present invention relates to trailers for being pulled behind a tow vehicle such as a truck, recreational vehicle or the like and for supporting a first load such as an automobile or the like and a second load such as a boat or the like.

2. Description of the Prior Art

Heretofore, various trailers and the like have been developed to be towed by a vehicle for transporting both a car and a boat or the like. See, for example, Watson, U.S. Pat. No. 3,970,203 which discloses a trailer combination comprising a lower trailer for supporting a boat or the like and an upper trailer rigidly mounted above the lower trailer for supporting a fold up camper trailer or the like; Prudhome, U.S. Pat. No. 4,068,772 which discloses a trailer combination that includes a trailer base for receiving an automobile or the like and a carrier frame carried by the trailer base and being movable relative to the trailer base and adapted for receiving a boat and trailer and the like; and Vencill, U.S. Pat. No. 4,221,420 which discloses a trailer combination having a first support assembly adapted to carry a car and a second support assembly adapted to carry a boat and supported on the first assembly by a pair of pivoted scissor arms slidably secured to the first and second support assemblies. None of the known prior art, taken as a whole disclose or suggest the present invention.

SUMMARY OF THE INVENTION

The present invention is directed toward improving upon prior dual load trailers. The concept of the present invention is to provide bracket means for coupling a pair of trailer assemblies to one another whereby the upper trailer assembly can be easily moved between a lowered position where a boat or the like can be loaded thereon and an upper position where an automobile or the like can be driven under the upper trailer assembly onto the lower trailer assembly.

The trailer of the present invention comprises, in general, a first support means for supporting a first load, the first support means including a frame member for receiving the first load and ground engaging wheel means for rollably supporting the frame member, the frame member having a front end and a rear end; a second support means for supporting a second load, the second support means including a frame member for receiving the second load, the frame members having a front end and a rear end; a first bracket means having a first end for being pivotally attached to the frame member of the first support means substantially adjacent the front end thereof and having a second end for being pivotally attached to the frame member of the second support means substantially adjacent the front end thereof; a second bracket means having a first end for being pivotally attached to the frame member of the first support means substantially adjacent the rear end thereof and having a second end for being pivotally attached to the frame member of the second support means substantially adjacent the rear end thereof; and winch means for causing the second support means to pivot between a down position in which the rear end of the frame member thereof is adjacent the ground surface to allow easy loading and unloading of the second load thereon and an up position in which the frame member thereof is positioned above the frame member of the first support means to allow easy loading and unloading of the first support means.

DESCRIPTION OF THE PREFERRED EMBODIMENT

Figure 1:
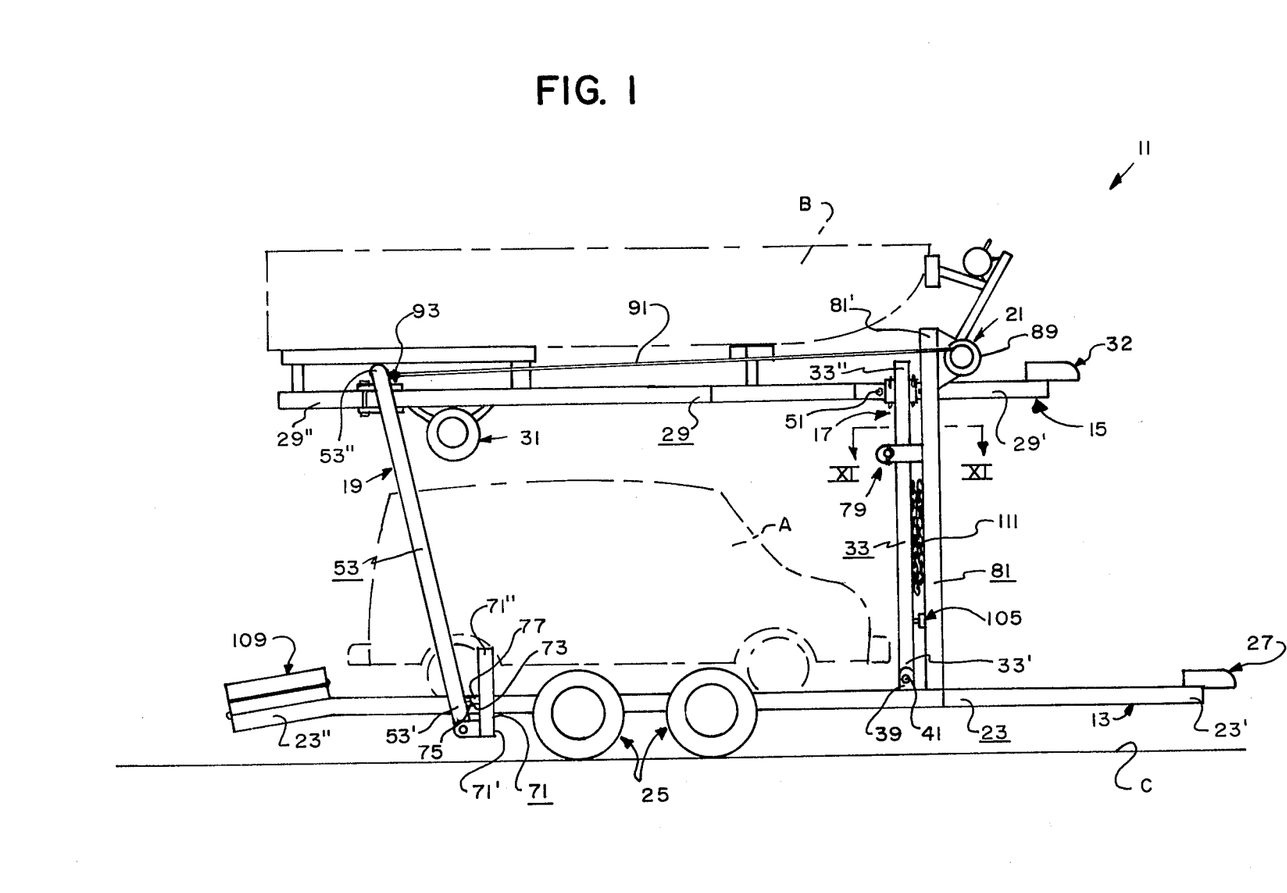
FIG. 1 is a somewhat diagrammatic side elevational view of the dual load trailer of the present invention.
Figure 4:
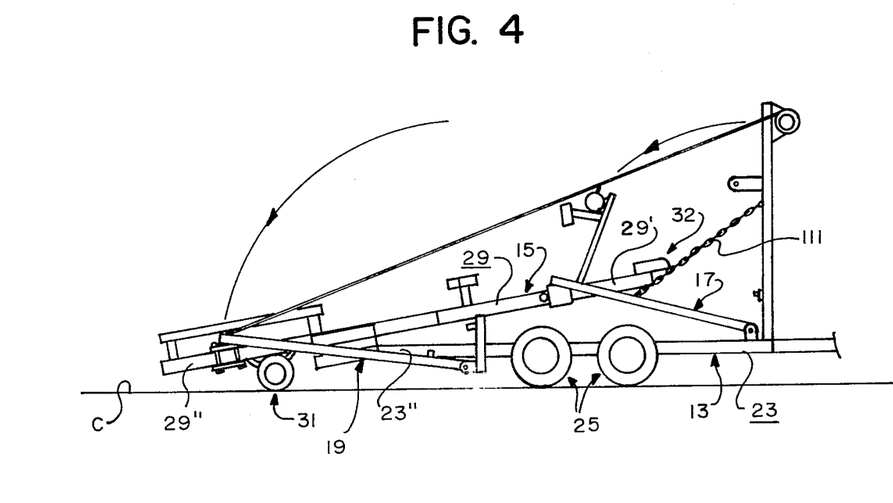
FIG. 4 is a side elevational view thereof substantially similar to FIG. 1 but reduced in scale and with the second support means in a down position.

The trailer 11 of the present invention is for being pulled behind a tow vehicle such as a truck, recreational vehicle or the like (not shown) and for supporting a first load A such as an automobile or the like and a second load B such as a boat or the like with the second load B positioned above the first load A (see FIG. 1). The trailer 11 includes, in general, a first support means 13 for supporting the first load A, a second support means 15 for supporting the second load B, a first bracket means 17 for pivotally connecting the front ends of the first and second support means 13, 15 to one another, a second bracket means 19 for pivotally attaching the rear ends of the first and second support means 13, 15 to one another, and a winch means 21 for causing the second support means 15 to pivot between a raised or up position as shown in FIG. 1 and a lowered or down position as shown in FIG. 4.

The first support means 13 may consist simply of substantially typical trailer for supporting an automobile or the like for being pulled behind a tow vehicle. Thus, the first support means 13 includes a frame member 23 for receiving the first load A and includes ground engaging wheel means 25 for rollably supporting the frame member 23 on the ground C. The frame member 23 may be of various constructions now apparent to those skilled in the art and includes, in general, a front end 23' and a rear end 23". The front end 23' preferably includes a standard hitch assembly 27 for allowing the trailer 11 to be coupled to the tow vehicle in the typical manner well known to those skilled in the art. The frame member 23 may be constructed from standard metal structural members (e.g., elongated metal I-beams, angle beams, channels, or the like) welded to one another to form a rigid, open frame work as will be apparent to those skilled in the art. The frame member 23 may include a floor of expanded metal or the like attached to the open frame work. Preferably, the rear end 23" of the frame member 23 is angled downward as clearly shown in FIG. 1 for reasons which will hereinafter become apparent. The wheel means 25 may include a pair of standard tandem wheel assemblies joined by standard axle means and springably coupled to the frame member 23 in a manner well known to those skilled in the art.

The second support means 15 may consist simply of substantially typical trailer for supporting a boat or the like and for being pulled behind a tow vehicle. Thus, the second support means 15 includes a frame member 29 for receiving the second load B. The second support means 15 may include ground engaging wheel means 31 for rollably supporting the frame member 23 on the ground C for reasons which will hereinafter become apparent. The frame member 29 may be of various constructions now apparent to those skilled in the art and includes, in general, a front end 29' and a rear end 29". The front end 29' of the frame member 29 may be provided with a typical hitch assembly 32 for being coupled to a tow vehicle for reasons which will hereinafter become apparent. The frame member 29 may include various metal structural members (e.g., metal I-beams, angle beams, or channels or the like) welded together to form a substantially rigid, open frame work. The frame member 29 may be provided with additional support means well known to those skilled in the art for securely supporting a boat or other second load B. The wheel means 31 may include wheel members joined by an axle and springably attached to the frame member 29 in a manner well known to those skilled in the art.

Figure 5:
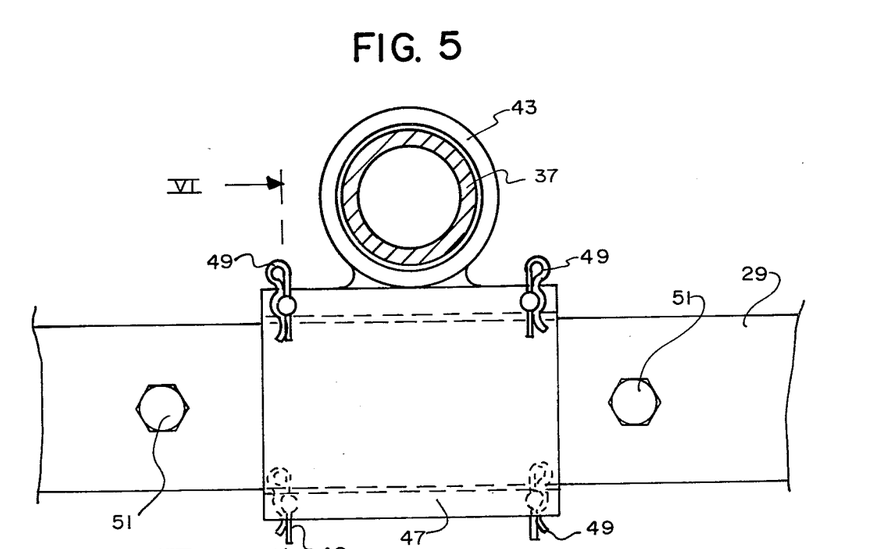
FIG. 5 is an enlarged sectional view substantially as taken on line V—V of FIG. 2.
Figure 6:
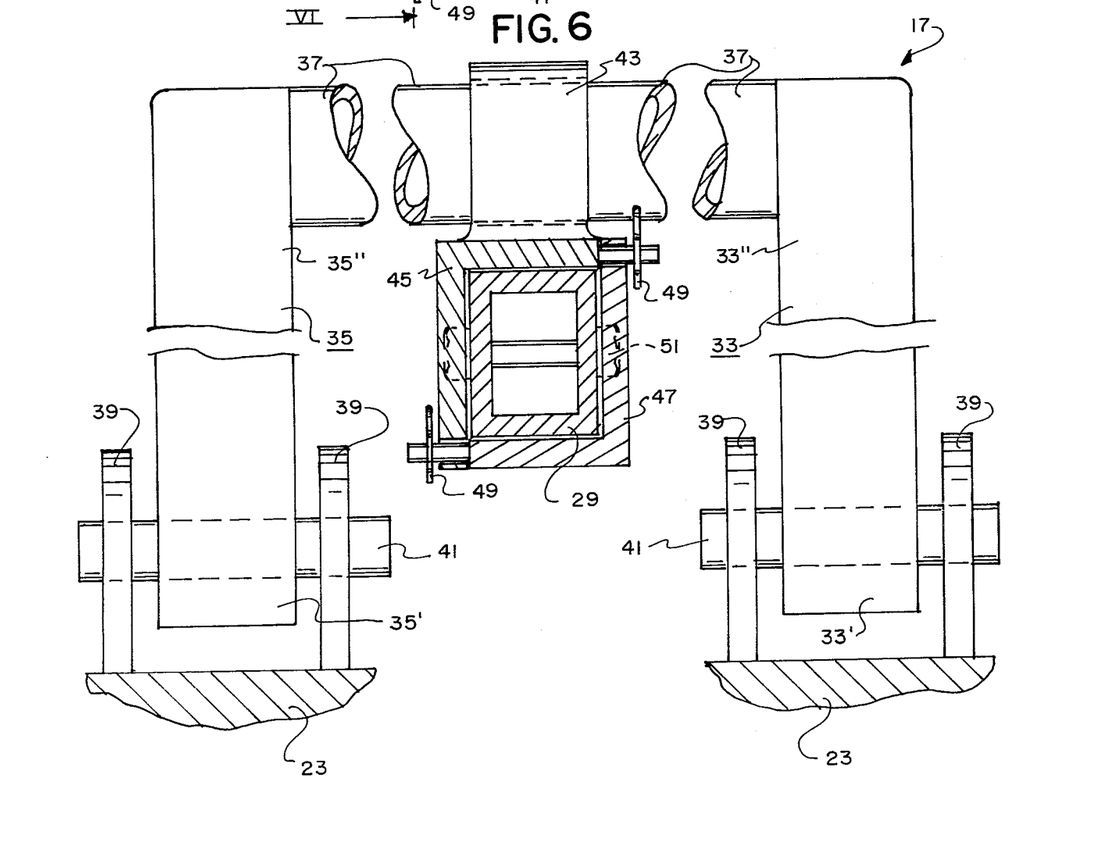
FIG. 6 is a sectional view substantially as taken on line VI—VI of FIG. 5 with additional portions broken away for clarity.

The first bracket means 17 has a first end for being pivotally attached to the frame member 23 of the first support means 13 substantially adjacent the front end 23' thereof and has a second end for being pivotally attached to the frame member 29 of the second support means 15 substantially adjacent the front end 29' thereof. Preferably, the first bracket means 17 consists of a substantially U-shaped member including a first elongated leg member 33 having a lower end 33' for being pivotally mounted to one side of the frame member 23 substantially adjacent the front end 23' thereof, includes a second leg member 35 having a lower end 35' for being pivotally mounted to the other side of the frame member 23 substantially adjacent the front end 23' thereof, and includes a cross member 37 extending between the upper end 33" of the first leg member 33 and the upper end 35" of the second leg member 35 to thereby fixedly attach the first and second leg member 33, 35 to one another. The lower ends 33', 35' of the first and second leg members 33, 35 may be pivotally attached to the frame member 23 in any manner apparent to those skilled in the art. For example, a pair of ear members 39 may be attached to either side of the frame member 23 adjacent the front end 23' thereof and a pivot rod 41 may be provided to extend through each ear member 39 and the lower ends 33', 35' of the first and second leg members 33, 35 as clearly shown in FIG. 6 to thereby pivotally attach the lower end of the first bracket means 17 to the frame member 23 of the first support means 13. The upper end of the first bracket means 17 can be attached to the frame member 29 of the second support means 15 in various manners. Preferably, a sleeve member 43 is provided on the cross member 37 as clearly shown in FIGS. 5 and 6 in such a manner that the sleeve member 43 can pivot about the cross member 37. The sleeve member 43 is, in turn, attached to the frame member 29 of the second support means 15 thereby causing the cross member 37 of the first bracket means 17 to be pivotally attached to the frame member 29. The sleeve member 43 may be attached to the frame member 29 in various manners. Preferably, a first angle member 45 is fixedly attached to the sleeve member 43 as by being welded thereto or the like as clearly shown in FIG. 6 and a second angle member 47 is removably attached to the first angle member 45 as shown in FIG. 6 to entrap and contain the frame member 29 therebetween thereby attaching the sleeve member 43 to the frame member 29. Well known quickrelease type attachment member 49 such as hitch pin clips or the like may be used to attach the second angle member 47 to the first angle member 45 in a manner as will now be apparent to those skilled in the art to allow quick disengagement of the frame member 29 from the first bracket means 17 for reasons which will hereinafter become apparent. As thus described and illustrated, the frame member 29 will be able to slide back and forth in the first and second angle members 45, 47 with respect to the first bracket means 17 for reasons which will hereinafter become apparent. Means for limiting this sliding movement are preferably provided. Thus, for example, boss members 51 may be provided on the frame member 29 as clearly shown in FIGS. 5 and 6 to thereby limit this sliding movement to a predetermined amount. The boss members 51 may consist simply of bolts or the like screwed into the frame member 29.

Figure 2:
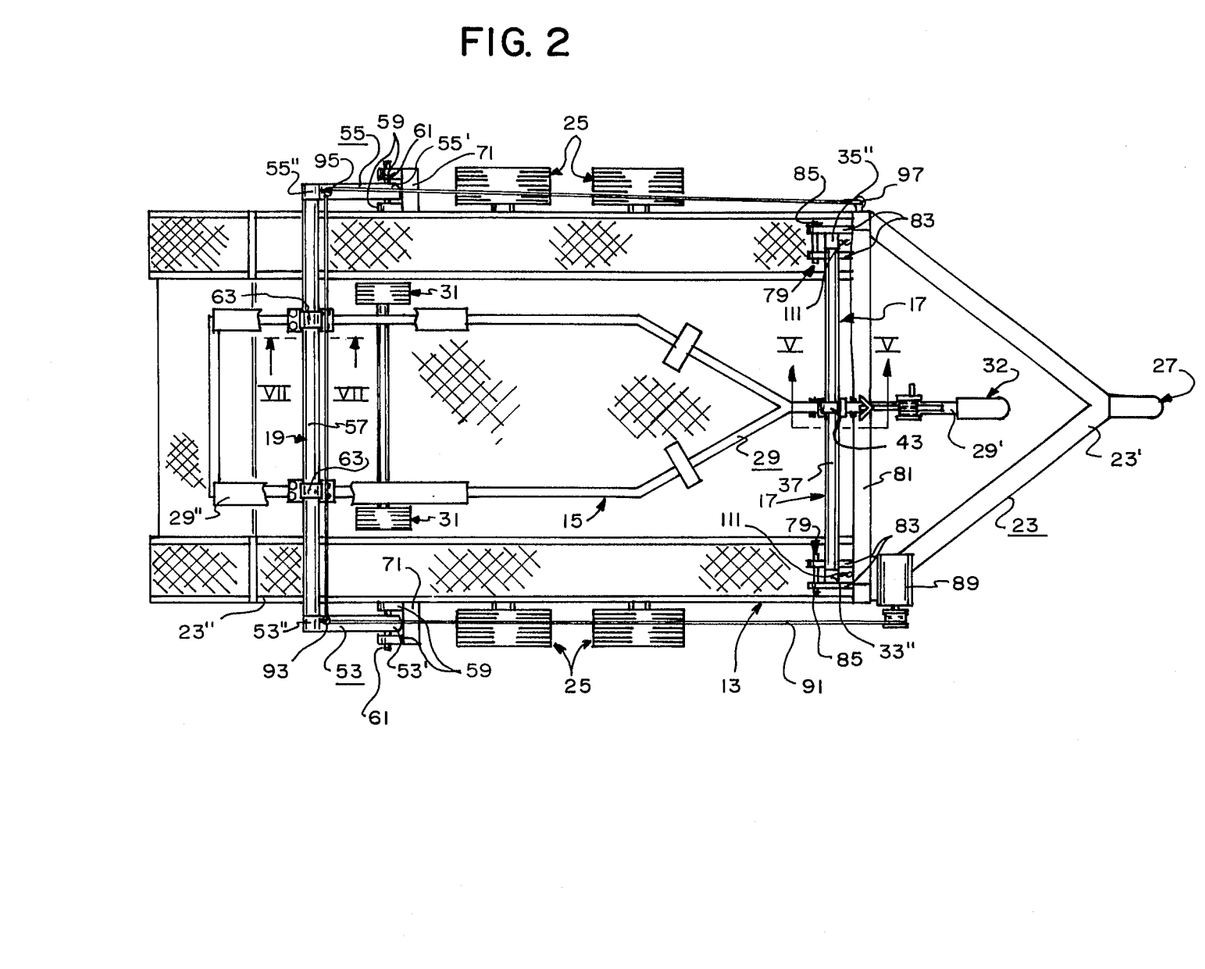
FIG. 2 is a top plan view thereof.
Figure 3:
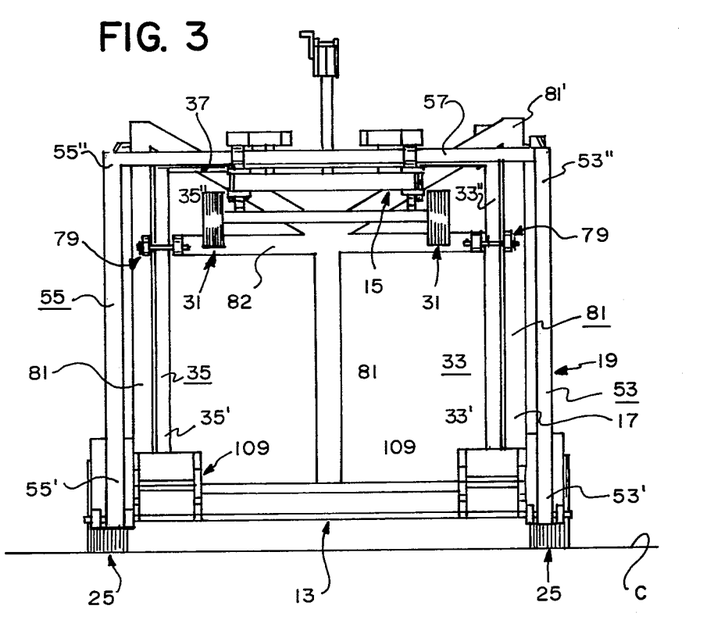
FIG. 3 is a rear elevational view thereof.
Figure 7:
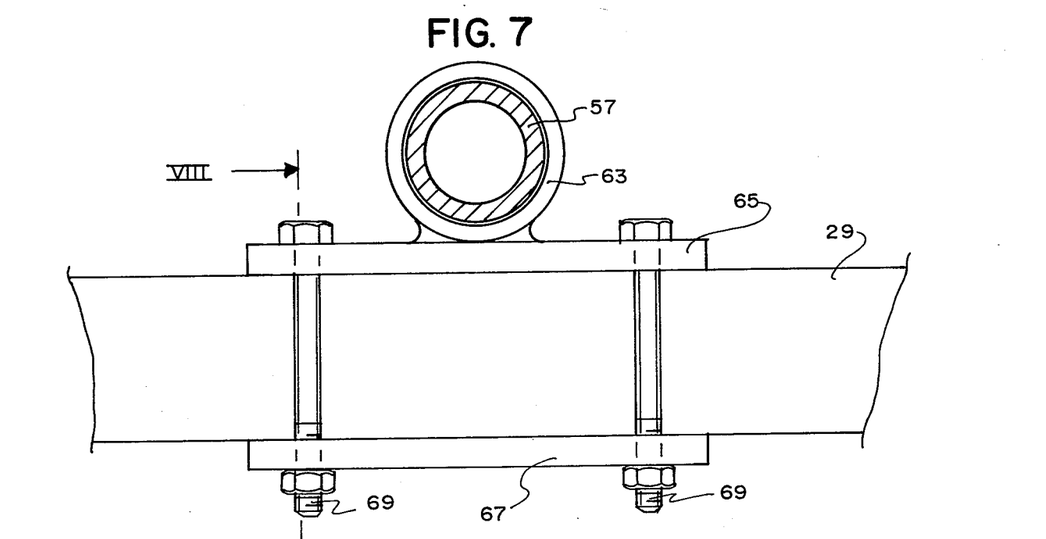
FIG. 7 is an enlarged sectional view substantially as taken on line VII—VII of FIG. 2.
Figure 8:
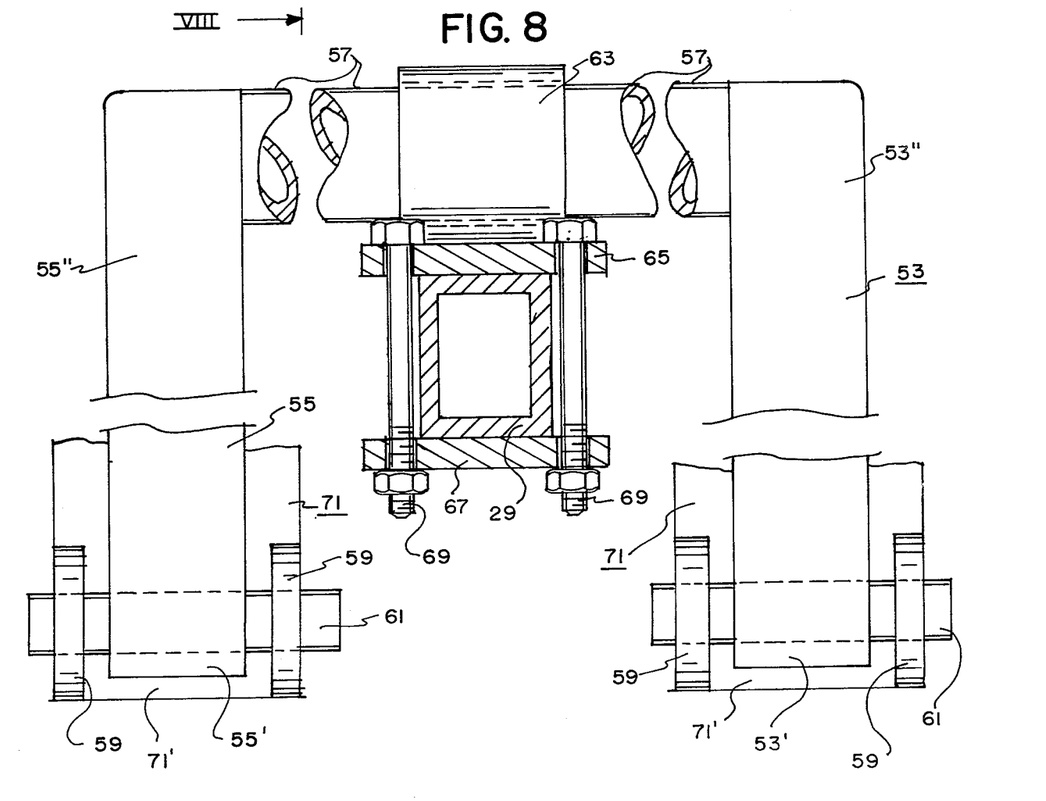
FIG. 8 is a sectional view substantially as taken on line VIII—VIII of FIG. 7 with additional portions broken away for clarity.

The second bracket means 19 has a first end for being pivotally attached to the frame member 23 of the first support means 13 substantially adjacent the rear end 23" thereof and has a second end for being pivotally attached to the frame member 29 of the second support means 15 substantially adjacent the rear end 29" thereof. The second bracket means 19 is also preferably a substantially U-shaped member and includes a first elongated leg member 53 having a lower end 53' for being pivotally attached to one side of the frame member 29 of the first support means 13 substantially adjacent the rear end 29" thereof, includes a second leg member 55 having a lower end 55' for being pivotally mounted to the other side of the frame member 23 of the first support means 13 substantially adjacent the rear end 23" thereof, and includes a cross member 57 having a first end for being fixedly attached to the upper end 53" of the first leg member 53 and has a second end for being fixedly attached to the upper end 55" of the second leg member 55 to thereby fixedly couple the upper ends 53", 55" of the first and second leg members 53, 55 to one another. The lower ends 53', 55' of the first and second leg members 53, 55 may be pivotally attached to the frame member 23 in various manners. Preferably, a pair of ear members 59 are provided on each side of the frame member 23 substantially adjacent the rear end 23" thereof and pivot rods 61 are provided to pivotally connect the lower ends 53', 55' of the first and second leg members 53, 55 to the ear members 59 as clearly shown in FIG. 8. The second end of the second bracket means 19 may be pivotally attached to the frame member 29 in various manners. Preferably the cross member 57 of the second bracket means 19 is pivotally attached to the frame member 29 substantially adjacent its rear end 29" at two spaced-apart locations. Thus, a pair of sleeve members 63 are preferably mounted on the cross member 57 in such a manner so that the cross member 57 can pivot therein (see, for example, FIGS. 2 and 7). Each sleeve member 63 can then in turn be fixedly attached to the frame member 29 at spaced-apart locations as clearly shown in FIG. 2. Thus, for example, a first plate member 65 is preferably fixedly attached to each sleeve member 63 by way of being welded thereto or the like. A second plate member 67 can then be fixedly mounted with respect to the first plate member 65 so as to contain and fixedly trap the frame member 29 therebetween, thus, causing the second bracket means 19 to be pivotally attached to the frame member 29. The second plate member 67 may be coupled to the first plate member 65 in various manners such as by the use of bolt means 69 or the like which allow a quick disconnect thereof for reasons which will hereinafter become apparent.

The second bracket means 19 is preferably pivotally attached to the frame member 23 of the first support means 13 at a lower point than the first bracket means 19 for reasons which will hereinafter become apparent. Thus, for example, a pair of substantially vertical members 71 may be fixedly attached to the frame member 23 substantially adjacent the rear end 23″ thereof with one vertical member 71 on either side of the frame member 23. The vertical members 71 have a lower end 71′ that extends below the frame member 23. The ear members 59 that serve to pivotally attach the lower ends 53′, 55′ of the first and second leg members 53, 55 to the frame members 23 are then fixedly attached to the lower end 71′ of each vertical member 71 to thereby cause the second bracket means to be pivotally attached to the frame member 23 at a lower point than the first bracket means 13.

The second end of the second bracket means 19 is preferably pivotally attached to the second support means 15 at a point rearward of the point where the first end of the second bracket means 17 is pivotally attached to the first support means 13 when the trailer 11 is in the up position. Thus, when the trailer 11 is in the up position as shown in FIG. 1, the first and second leg members 53, 55 of the second bracket means 19 will be rearwardly angled as shown in FIG. 1 for reasons which will hereinafter become apparent.

Figure 9:
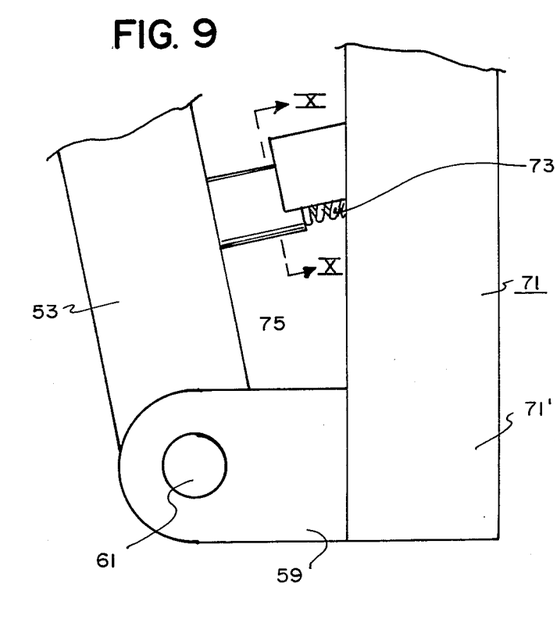
FIG. 9 is an enlarged view of a portion of FIG. 1.
Figure 10:
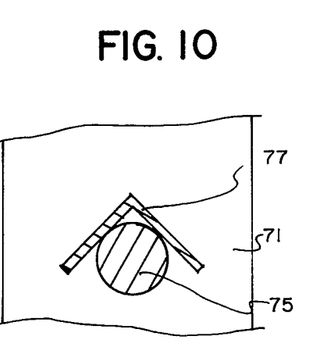
FIG. 10 is a sectional view substantially as taken on line X—X of FIG. 9.

The slidable arrangement between the sleeve member 43 and the frame member 29 of the second support means 15 allows the frame member 29 to move between a forward position and a rearward position with respect to the first bracket means 17. The trailer 11 preferably includes spring means for normally holding the frame member 29 of the second support means 15 in the rearward position when the second support means 15 is in the up position. The spring means preferably includes a spring member 73 arranged so as to engage each leg member 53, 55 of the second bracket means 19 to urge the second bracket means 19 rearwardly about the pivot rods 61. The spring member 73 may be fixedly attached to the vertical members 71 substantially adjacent the upper ends of 71″ thereof as clearly shown in FIGS. 1 and 9. The first and second leg members 53, 55 may be provided with a bossed portion 75 for coacting with the spring members 73 as clearly shown in FIG. 9 whereby the spring member 73 will urge the second bracket member 19 and, thereby, the frame member 29 of the second support means 15 rearwardly when the second support means 15 is in the up position as shown in FIG. 1. A cover member 77 may be positioned over each spring member 73 and attached to the vertical members 71 to protect the spring members 73 and prevent misalignment thereof (see, in general, FIGS. 9 and 10).

Figure 11:
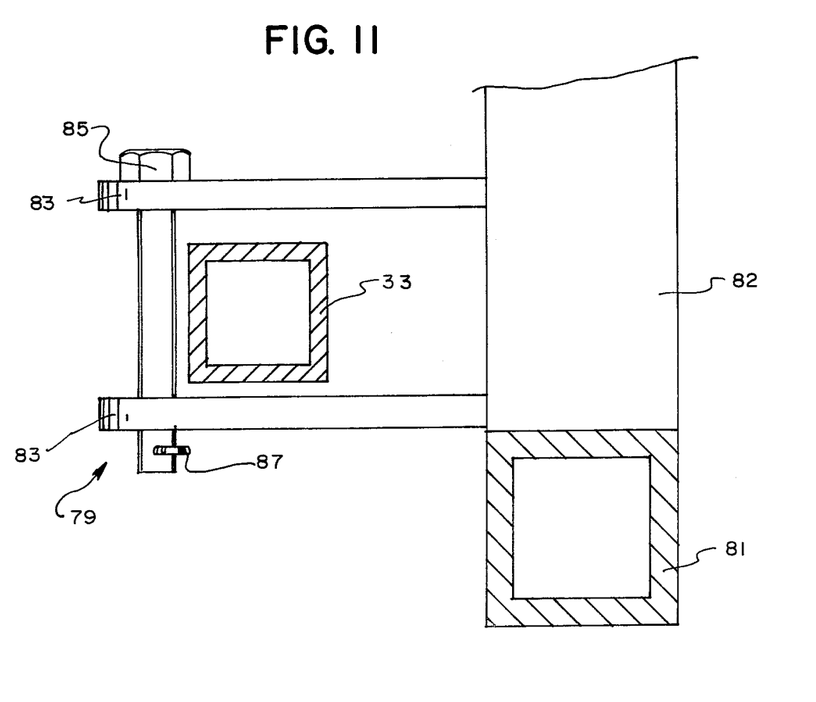
FIG. 11 is an enlarged sectional view substantially as taken on line XI—XI of FIG. 1.
Figure 12:
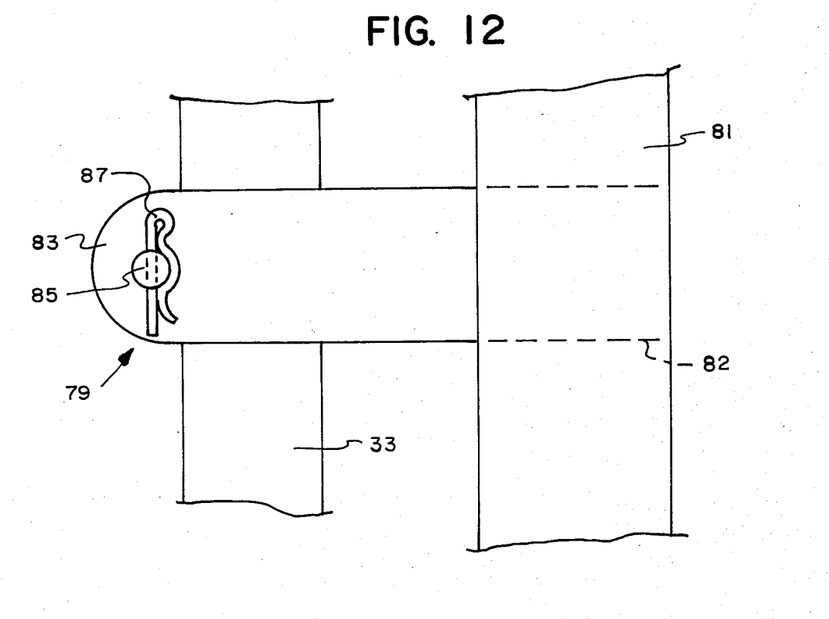
FIG. 12 is a side elevational view of FIG. 11.

The trailer 11 preferably includes lock means 79 for positively locking the second support means 15 in the up position. The first support means 13 may be provided with a pair of upwardly extending members 81 fixedly attached to the frame member 23 substantially adjacent the front end 23′ thereof. The lock means 79 may include tab members 83 attached to a cross piece 82 extending between the upwardly extending members 81 so as to be coextensive with a portion of the first bracket means 17 when the second support means 15 is in the up position. Thus, the tab members 83 may extend on either side of a portion of the first leg member 33 of the first bracket means 17 when the second support means 15 is in the up position as clearly shown in FIGS. 11 and 12. The lock means 79 may additionally include a pin member 85 for extending through both tab members 83 and past the first leg member 33 of the first bracket means 17 when the second support means 15 is in the up position to positively lock the second support means in the up position as clearly shown in FIGS. 11 and 12. A quick-release attachment member 87 such as a standard hitch pin clip or the like may be provided to secure the pin member 85 to the tab members 83.

The winch means 21 preferably includes an electric motor 89 fixedly anchored to the first support means 13 substantially adjacent the front end 23′ of the frame member 23 thereof, and preferably includes a cable member 91 for extending from the electric motor 89 to the second bracket member 19 substantially adjacent the second or upper end thereof. More specifically, the electric motor 89 may be anchored on one side of one upperwardly extending member 81 substantially adjacent the upper end 81′ thereof as clearly shown in FIGS. 1 and 2 and the cable member 91 may extend from the electric motor 89 rearwardly to an eye-bolt 93 or the like attached to the upper end 53″ of the first leg member 53, across to another eye-bolt 95 or the like attached to the upper end 55″ of the second leg member 55 and back to another eye-bolt 97 or the like anchored to the upper end 81′ of the upwardly extending member on the opposite side thereof from the electric motor 89 as clearly shown in FIG. 2. Thus, operation of the electric motor 89 will cause the cable member 91 to either raise the second bracket member 19 from a lowered position as shown in FIG. 4 to the raised position as shown in FIG. 1 thus causing the second support means 15 to move from the down position as shown in FIG. 4 to the up position as shown in FIG. 1, or allow the second bracket means 19 and second support means 15 to move from the up position to the down position in a manner as will now be apparent to those skilled in the art.

Figure 13:
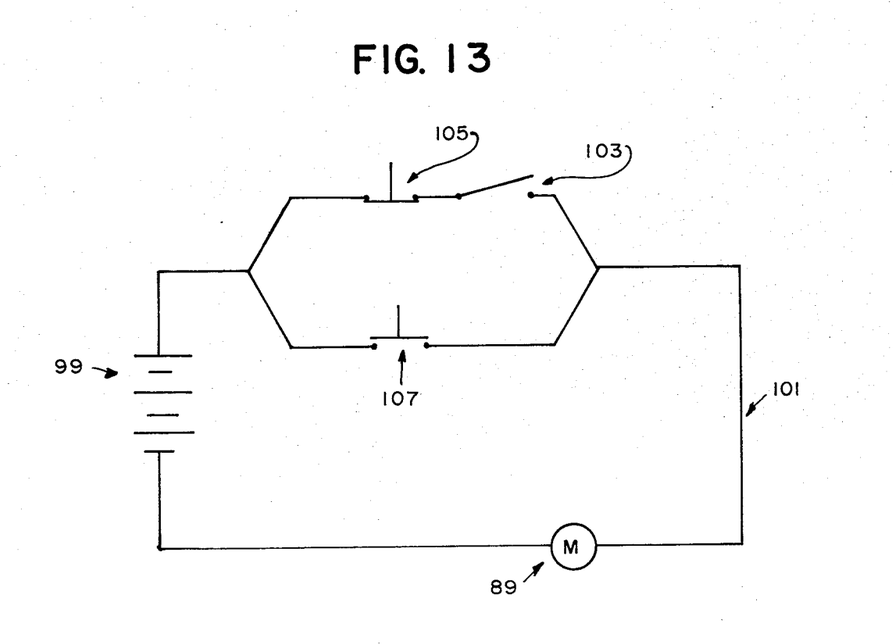
FIG. 13 is a schematic view of the electrical components of the present invention.

The trailer 11 preferably includes a source of electrical energy 99 such as a standard battery or the like and an electric circuit 101 for coupling the source of electrical energy 99 to the electric motor 89. The electric circuit 101 preferably includes a main switch 103 for controlling the operation of the electric motor 89, a limit switch 105 for preventing the winch means 21 from raising the second support means 15 past a preset point, and a by-pass switch 107 for allowing the limit switch 105 to be selectively by-passed (see, in general, FIG. 13). The limit switch 105 is preferably a normally closed switch positioned on the upperwardly extending member 81 in such a position that it will be contacted by, and, thereby opened, by the first bracket means 17 when the second support means 15 is in the up position as shown in FIG. 1.

The trailer 11 preferably includes fold down ramp means 109 positioned on the rear end 23' of the frame member 23 to allow easy loading and unloading of the first load A onto and off of the frame member 23 of the first support means 13. The ramp means 109 can be of various construction which should now be apparent to those skilled in the art.

The trailer 11 preferably includes safety chains 11 extending between the leg members 33, 35 of the first bracket means 17 and the upwardly extending members 81 to prevent the first bracket means 17 from being lowered past a pre-determined point as clearly shown in FIG. 4.

A fairing or the like (not shown) may be attached to the front end 23' of the frame member 23 to reduce drag and increase the aerodynamics of the trailer 11 in a manner as will now be apparent to those skilled in the art.

The operation and use of the trailer 11 is quite simple. If it is desired to tow both a first load A such as an automobile and a second load B such as a boat behind a single tow vehicle, the second load B is first loaded onto the second support means 15 in the typical manner when the second supoort means 15 is in the down position shown in FIG. 4. After the second load B is secured to the second support means 15, the winch means 21 is activated to cause the second support means 15 to be raised to the up position shown in FIG. 1. The fact that the second bracket means 17 is pivotally attached to the first support means 13 at a lower point than the first bracket means 17 will make it easier to raise the second support means 15 due to the additional leverage so provided. The winch means 21 will be automatically deactivated by the limit switch 105 when the second support means 15 is fully raised. The lock means 79 is then used to secure the second support means 15 in the up position and the winch means 21 can be "backed-off" to release tension on the cable member 91. The ramp means 109 can then be folded down to allow the first load A to be easily loaded onto the first support means 13 in the typical manner. To unload the trailer 11, the first load A is first unloaded from the first support means 13 with the aid of the ramp means 109 in the typical manner. The pin member 85 can then be removed to unlock the second support means 15 (it may be required to activate the winch means 21 by way of the by-pass switch 107 to obtain sufficient slack to remove the pin member 85). The winch means 21 is then activated to allow the second support means 15 to lower to the down position as shown in FIG. 4. The fact that the second end of the second bracket member 19 is pivotally attached to the second support means 15 at a point rearward of the point where the first end of the second bracket means 19 is pivotally attached to the first support means 13 will make it easier to lower the second support means 15 due to the additional leverage so provided. The sliding feature of the pivotal connection between the second support means 15 and the first bracket means 17 will allow the second support means 15 to move with respect to the first bracket means 17 to accomodate variations in the level of the ground C at the rearward end of the trailer 11. The second load B can then be unloaded from the second support means 15 in the typical manner. It should be noted that the second support means 15 can be quickly and easily disengaged from the rest of the trailer 11 by way of the quick-release attachment members 49 and bolt means 69 if it is desired to use the first and second support means 13, 15 separately.

Although the present invention has been described and illustrated with respect to a preferred embodiment, it is not to be so limited since changes and modifications can be made therein which are within the full intended scope of the invention.

I claim:

1. A trailer comprising:
    (a) a first support means for supporting a first load, said first support means including a frame member for receiving said first load and ground engaging wheel means for rollably supporting said frame members, said frame members having a front end and a rear end;
    (b) a second support means for supporting a second load, said support means including a frame member for receiving said second load, said frame member having a front end and a rear end;
    (c) a first bracket means having a first end for being pivotally attached to said frame member of said first support means substantially adjacent said front end thereof and having a second end for being pivotally attached to said frame member of said second support means substantially adjacent said front end thereof;
    (d) a second bracket means having a first end for being pivotally attached to said frame member of said first support means substantially adjacent said rear end thereof and having a second end for being pivotally attached to said frame member of said second support means substantially adjacent said rear end thereof, said second bracket means being pivotally attached to said frame member of said first support means at a lower point than said first bracket means: and
    (e) winch means for causing said second support means to pivot between a down position in which said rear end of said frame member thereof is adjacent said ground surface to allow easy loading and unloading of said second load thereon and an up position in which said frame member thereof is positioned above said frame member of said first support means to allow easy loading and unloading of said first support means.

2. The trailer of claim 1 in which said second end of said second bracket means is pivotally attached to said second support means at a point rearward of the point where said first end of said second bracket means is pivotally attached to said first support means.

3. The trailer of claim 2 in which is included a pivot means for pivotally attaching said second end of said first bracket means to said frame means of said second support means, said pivot means being slidable with respect to said second support means to allow said frame member of said second support means to move between a forward position and a rearward position with respect to said first bracket means.

4. The trailer of claim 3 in which is included means for normally holding said frame member of said second support means in said rearward position when said second support means is in said up position.

5. The trailer of claim 4 in which is included lock means for positively locking said second support means in said up position.

6. The trailer of claim 5 in which said first support means is provided with an upwardly extending member fixedly attached to said frame member thereof substantially adjacent said front end thereof; and in which said lock means includes tab members attached to said upwardly extending member so as to be coextensive with a portion of said first bracket means when said second support means is in said up position, and includes a pin member for extending through both said tab members and past said first bracket means when said second support means is in said up position to positively lock said second support means in said up position.

7. The trailer of claim 6 in which said winch means includes an electric motor fixedly anchored to said first support means substantially adjacent said front end of said frame member thereof, and includes a cable member for extending from said electric motor to said second bracket member substantially adjacent said second end thereof.

8. The trailer of claim 7 in which is included a source of electrical energy and an electric circuit for coupling said source of electrical energy to said electric motor; said electric circuit including a main switch for controlling the operation of said electric motor, a limit switch for preventing said winch means from raising said second support means past a pre-set point, and a by-pass switch for allowing said limit switch to be selectively by-passed.

* * * * *